(12) United States Patent
Martin et al.

(10) Patent No.: US 12,074,471 B2
(45) Date of Patent: Aug. 27, 2024

(54) APPARATUS AND METHODS FOR DISTRIBUTION OF UPS-ASSOCIATED ENERGY STORAGE

(71) Applicant: Eaton Intelligent Power Limited, Dublin (IE)

(72) Inventors: James Edwin Martin, Fletcher, NC (US); James Michael Andrew Queen, Raleigh, NC (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/126,861

(22) Filed: Dec. 18, 2020

(65) Prior Publication Data
US 2022/0200327 A1 Jun. 23, 2022

(51) Int. Cl.
*H02J 9/06* (2006.01)
(52) U.S. Cl.
CPC .................. *H02J 9/061* (2013.01)
(58) Field of Classification Search
CPC ........................................ H02J 9/061
USPC .................................... 307/66, 64
See application file for complete search history.

(56) References Cited

U.S. PATENT DOCUMENTS

| 8,291,490 | B1 | 10/2012 | Ahmed |
| 8,819,801 | B2 | 8/2014 | Sangubhatla |
| 9,519,510 | B2 | 12/2016 | Strauss et al. |
| 2009/0288084 | A1 | 11/2009 | Astete |
| 2010/0325281 | A1 | 12/2010 | Li |
| 2010/0332373 | A1 | 12/2010 | Crabtree |
| 2011/0246526 | A1 | 10/2011 | Finkelstein |
| 2012/0265741 | A1 | 10/2012 | Moon |
| 2013/0204439 | A1 | 8/2013 | Sceizi |
| 2013/0238488 | A1 | 9/2013 | Bouey |
| 2013/0297655 | A1 | 11/2013 | Narasayya |
| 2013/0034587 | A1 | 12/2013 | Barkett |

(Continued)

FOREIGN PATENT DOCUMENTS

| CN | 106452737 | 2/2017 |
| CN | 106471477 | 3/2017 |

(Continued)

OTHER PUBLICATIONS

Schiller; *This Blockchain-Based Energy Platform is Building a Peer-to-Peer Grid*, American Business Magazine; Oct. 16, 2017, pp. 1-3; https://www.fastcompany.com.

(Continued)

*Primary Examiner* — Michael R. Fin
(74) *Attorney, Agent, or Firm* — Stanek Lemon Crouse & Meeks, PA (57) ABSTRACT

An uninterruptible power supply (UPS) includes an energy routing circuit coupled to a grid and an energy storage device and configured to selectively provide energy to a first load from the grid and the energy storage device based on a state of the grid. The UPS further includes a controller configured to control the energy routing circuit and to implement a first UPS node configured to establish and execute a first smart contract for energy exchange with a first consumer node associated with the first load and at least one second smart contract for energy exchange with at least one of a grid node associated with the grid and a second consumer node associated with a second load coupled to the grid via a second UPS.

20 Claims, 12 Drawing Sheets

(56) References Cited

U.S. PATENT DOCUMENTS

| | | | |
|---|---|---|---|
| 2013/0346587 A1 | 12/2013 | Barkett | |
| 2014/0058958 A1 | 2/2014 | Billings | |
| 2014/0295956 A1 | 10/2014 | Katz | |
| 2015/0040121 A1 | 2/2015 | Barabash | |
| 2015/0094968 A1 | 4/2015 | Jia | |
| 2015/0242479 A1 | 8/2015 | Cheenath et al. | |
| 2016/0239343 A1 | 8/2016 | Holt | |
| 2016/0371315 A1 | 12/2016 | Kwon et al. | |
| 2017/0042068 A1 | 2/2017 | Orsini et al. | |
| 2017/0054134 A1* | 2/2017 | Choi | G01R 31/36 |
| 2017/0103468 A1 | 4/2017 | Orsini | |
| 2017/0213210 A1 | 7/2017 | Kravitz | |
| 2017/0243214 A1 | 8/2017 | Johnsrud | |
| 2017/0324620 A1 | 11/2017 | Ellis | |
| 2017/0338960 A1 | 11/2017 | Cesnik | |
| 2017/0358041 A1* | 12/2017 | Forbes, Jr. | G05D 3/12 |
| 2017/0373940 A1 | 12/2017 | Shahab | |
| 2018/0096175 A1 | 4/2018 | Schmeling | |
| 2018/0167270 A1 | 6/2018 | Carbone | |
| 2018/0189753 A1 | 7/2018 | Konda | |
| 2018/0226755 A1 | 8/2018 | Davies | |
| 2018/0297724 A1 | 10/2018 | Harvey | |
| 2018/0308184 A1 | 10/2018 | Pankanti | |
| 2018/0341307 A1 | 11/2018 | Shaikh | |
| 2018/0367363 A1 | 12/2018 | Jaeger | |
| 2019/0058709 A1 | 2/2019 | Kempf | |
| 2019/0089155 A1* | 3/2019 | Cui | G06Q 10/00 |
| 2019/0102163 A1 | 4/2019 | Witherspoon | |
| 2019/0173282 A1 | 6/2019 | Lelusz | |
| 2019/0243572 A1 | 8/2019 | Kursun | |
| 2019/0272016 A1 | 9/2019 | Frias | |
| 2019/0288513 A1* | 9/2019 | Nakayama | H02J 3/381 |
| 2019/0295052 A1 | 9/2019 | Muthu | |
| 2019/0353685 A1* | 11/2019 | Almeida Cavoto | G06Q 20/145 |
| 2019/0362446 A1 | 11/2019 | Navarro | |
| 2019/0385182 A1* | 12/2019 | Price | H02J 13/0006 |
| 2020/0074572 A1* | 3/2020 | Romney | G06Q 40/04 |
| 2020/0286184 A1 | 9/2020 | Orsini | |
| 2021/0081404 A1 | 3/2021 | Kempf | |
| 2022/0121260 A1* | 4/2022 | King | H02J 3/007 |

FOREIGN PATENT DOCUMENTS

| | | |
|---|---|---|
| JP | 2015181045 | 10/2015 |
| WO | 2019/070357 A1 | 4/2019 |
| WO | 2020/154326 A1 | 7/2020 |

OTHER PUBLICATIONS

Hollerith; *India Trials a Power Grid on the Blockchain to Incentivize Sustainable Energy*, Bitcoin Magazine, (Oct. 10, 2017); pp. 1-4; https://bitcoinmagazine.com.

SmartCitiesWorld news team; *Blockchain Fosters Peer-to-Peer Energy Exchanges*, SmartCitiesWorld; Sep. 27, 2017; pp. 1-7; https://www.smartcitiesworld.net.

New Continuum Data Center; *Cryptocurrency Mining and Blockchain Technology in a Multi-Tenant Data Center*; Dec. 20, 2017; pp. 1-2; https://newcontinuum.net/.

Islam et al.; *A Market Approach for Handling Power Emergencies in Multi-Tenant Data Center*; 978-1-4673-9211 (2016) IEEE; 12 pages.

Computerweekly.com; *Can a Private Cloud Drive Energy Efficiency in Datacentres?* (Mar. 12, 2012) pp. 1-3; https://www.computerweekly.com.

Duplan; *Blockchain Technology for Emissions Management*, Feb. 27, 2018; pp. 1-14; https://medium.com.

Ellul et al., "AlkylVM: A Virtual Machine for Smart Contract Blockchain Connected Internet of Things," IEEE, 2018, 4 pages.

Horta et al., "Novel paradigms for advanced distribution grid energy management," ARXIV.org, Cornell University Library, Dec. 11, 2017, 14 pages.

Li et al., "Service Orchestration and Federation for Verticals," 2018 IEEE Wireless Communications and Networking Conference Workshops (WCNCW): The First Workshop on Control and Management of Vertical Slicing Including the Edge and Fog Systems (COMPASS), 6 pages.

Thakur, Mukesh, "Authentication, Authorization and Accounting with Ethereum Blockchain," Master's Thesis, University of Helsinki, Department of Computer Science, Sep. 13, 2017, 71 pages.

Notification of Transmittal of the International Search Report and the Written Opinion of the International Searching Authority, of the Declaration, PCT/EP2019/025155, Jul. 17, 2019, 13 pages.

Notification of Transmittal of the International Search Report and the Written Opinion of the International Searching Authority, or the Declaration, PCT/EP2021/025510, Mar. 17, 2022.

Klyman "Four Big Advantages of Multi-Tenant Data Centers" (2014) (retrieved from https://www.datacenterknowledge.com/archives /2014/08/07/four-big-advantages-multi-tenant-data-centers) (2014).

\* cited by examiner

APPARATUS AND METHODS FOR DISTRIBUTION OF UPS-ASSOCIATED ENERGY STORAGE

BACKGROUND

Uninterruptible power supplies (UPSs) are used in a variety of applications to provide reliable power for critical applications, such as in data centers, industrial sites and medical facilities. A typical UPS provides uninterruptible power to a critical load by switching from a primary power source, such as a utility feed, to a backup power source, such as a battery. In some applications, additional backup power may be provided by a local generator (e.g., a diesel or natural gas generator), with the battery serving as a short-term backup until the local generator can be brought online to serve the critical load during longer outages.

Due to the general reliability of the grid in most advanced countries, UPSs typically do not operate on battery for significant amounts of time. Accordingly, much of the storage capacity is essentially stranded if its use is limited to simply providing backup power in the case of relatively infrequent utility outages. This stranded capacity may be quite large in applications such as data centers, which may include several UPSs and associated batteries. The advent of lithium ion battery technology has also enabled the ability for UPS-associated energy storage to have increased capacity and cycling capability. Accordingly, there has been increased interest in using the batteries associated with UPSs as distributed energy resources, i.e., storage that can be used to store excess power from the grid (e.g., from stochastic sources such as solar arrays and wind-powered generators) and to deliver this stored power back to the grid.

SUMMARY

Some embodiments of the inventive subject matter provide an uninterruptible power supply (UPS) including an energy routing circuit coupled to a grid and an energy storage device and configured to selectively provide energy to a first load from the grid and the energy storage device based on a state of the grid. The UPS further includes a controller configured to control the energy routing circuit and to implement a first UPS node configured to establish and execute a first smart contract for energy exchange with a first consumer node associated with the first load and at least one second smart contract for energy exchange with at least one of a grid node associated with the grid and a second consumer node associated with a second load coupled to the grid via a second UPS.

The at least one second smart contract may include a smart contract with the second consumer node that causes the energy routing circuit to provide energy from the energy storage device to the first load in lieu of drawing an amount of energy from the grid and credits the first UPS node and debits the second consumer node for the amount of energy. The at least one second smart contract may include a smart contract with the second consumer node that causes the energy routing circuit to transfer an amount of energy from the energy storage device to the grid and credit the first UPS node and debits the second consumer node for the amount of energy. The at least one second smart contract may include a smart contract with the grid node that causes the energy routing circuit to provide energy from the energy storage device to the first load in lieu of drawing an amount of energy from the grid and credits the first UPS node and debits the grid node for the amount of energy. The at least one second smart contract may include a smart contract with the grid that causes the energy routing circuit to transfer an amount of energy from the energy storage device to the grid and credits the first UPS node and debits the grid node for the amount of energy.

The at least one second smart contract may include a smart contract with the second consumer node that causes the energy routing circuit to transfer an amount of energy from the energy storage device to the second UPS via the grid and credits the first UPS node and debits the second consumer node for the amount of energy. The smart contract with the second consumer node may be executed responsive to a grid outage.

According to some aspects, the at least one second smart contract may limit extraction of energy from the energy storage device to maintain an amount of reserve capacity necessary to maintain the load in the event of an outage of the grid.

According to further aspects, the controller of the UPS may be configured to automatically execute the first smart contract and the at least one second smart contract to perform energy crediting and debiting in a distributed ledger responsive to peer-to-peer communications between the controller of the UPS and at least one of a controller of the grid, a controller of the second UPS and a controller of the second load.

Further embodiments of the inventive subject matter provide a system including a grid, a first UPS coupled to the grid and comprising a first energy routing circuit configured to selectively provide energy to a first load from the grid and a first energy storage device, and a second UPS coupled to the grid and comprising a second energy routing circuit configured to selectively provide energy to a second load from the grid and a second energy storage device. The system further includes respective controllers associated with the grid, the first UPS, the second UPS, the first load and the second load and configured to implement a grid node, a first UPS node, a second UPS node, a first consumer node and a second consumer node, respectively, that establish and execute smart contracts for exchanges of energy among the first UPS, the second UPS, the first load, the second load, and the grid.

The smart contracts may include a smart contract between the first UPS node and the second consumer node that causes the first energy routing circuit to provide energy from the first energy storage device to the first load in lieu of drawing an amount of energy from the grid and credits the first UPS node and debits the second consumer node for the amount of energy. The smart contracts may include a smart contract between the first UPS node and the second consumer node that causes the first energy routing circuit to transfer an amount of energy from the first energy storage device to the grid and credits the first UPS node and debits the second consumer node for the amount of energy. The smart contracts may include a smart contract between the first UPS node and the grid node that causes the first energy routing circuit to provide energy from the first energy storage device to the first load in lieu of drawing an amount of energy from the grid and credits the first UPS node and debits the grid node for the amount of energy. The smart contracts may include a smart contract between the first UPS node and the grid node that causes the first energy routing circuit to transfer an amount of energy from the first energy storage device to the grid and credits the first UPS node and debits the grid node for the amount of energy.

The smart contracts may include a smart contract between the first UPS node and the second consumer node that causes the first energy routing circuit to transfer an amount of energy from the energy storage device to the second load via the second UPS and the grid and credits the first UPS node and debits the second consumer node for the amount of energy. The smart contract between the first UPS node and the second consumer node may be executed responsive to a grid outage while the first and second UPS s are isolated from at least a portion of the grid.

Further embodiments provide methods of operating a system comprising a grid, a first UPS coupled to the grid and comprising a first energy routing circuit configured to selectively provide energy to a first load from the grid and a first energy storage device, and a second UPS coupled to the grid and comprising a second energy routing circuit configured to selectively provide energy to a second load from the grid and a second energy storage device. The methods include operating respective controllers associated with the grid, the first UPS, the second UPS, the first load and the second load and configured to implement a grid node, a first UPS node, a second UPS node, a first consumer node and a second consumer node, respectively, that establish and execute smart contracts for exchanges of energy among the first UPS, the second UPS, the first load, the second load, and the grid.

DETAILED DESCRIPTION

The inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Example embodiments are described herein with reference to block diagrams and/or flowchart illustrations of methods, devices, systems and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a tangible or non-transitory computer-readable storage medium that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a computer-usable or computer-readable storage medium having tangible, non-transitory computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" Of "tangible memory" are intended to encompass types of storage devices that do not necessarily store information permanently, including for example, random access memory (RAM), Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

Embodiments described herein relate to the use of smart contracts. As used herein, a "smart contract" is a computer program or a transaction protocol which is intended to automatically execute, control or document legally relevant events and actions according to the terms of a contract or an agreement. Such computer programs or transaction protocols include, but are not limited to, general purpose computation that takes place on a blockchain or distributed ledger. Some smart contracts may be viewed as a collection of code and data (sometimes referred to as functions and state) that is deployed using cryptographically signed transactions on the blockchain network, but embodiments of the inventive subject are not limited thereto.

Some embodiments provide systems, methods, and computer program products that can be used to coordinate distributed pluralities of UPSs as an energy aware aggregate. Some embodiments described herein can increase the efficiency of the energy distribution grid and allow each UPS to accrue value. This value may be accrued as, for example, cryptographic tokens, such as protocol tokens, platform tokens, utility tokens, security tokens, commodity tokens, stable tokens, or asset tokens. Energy aware controllers according to some embodiments may also allow a grid to interact in a modular fashion, store and access telemetry, perform maintenance functions, and execute energy aware functionality utilizing a decentralized ledger as a record of each transaction. By connecting UPS s in a decentralized energy aware storage system, energy storage associated with the UPSs can be used not only for energy backup, but also for ancillary grid related services such as peak load shaving and frequency regulation, and for energy arbitrage among consumers and suppliers of energy. This level of orchestration can also provide a foundation for predictive maintenance and the automatic execution of service contracts.

Some embodiments may provide apparatus, methods, and computer program products that can coordinate decentralized swarms of UPS devices as an energy aware aggregate. M2M transactions and contracts between each energy aware controller on the grid will be mediated by a computational network which could manifest as a monolithic on premise application, fog based application as established by the OFC, the OCF, or others, cloud based application or as a distributed ledger technology, such as a block chain or directed acyclic graph protocol (e.g. Ethereum, IOTA Tangle, or others).

Some embodiments provide two types of operation based on the UPS technology: (1) offline embodiments that involve a UPS ceasing to draw power from the energy grid while continuing to supply energy to one or more primary energy consumers; and (2) online embodiments that involve pushing stored energy back to the grid. Using automatically-executing smart contracts, nodes associated with respective UPSs can be debited for energy drawn from the grid or credited for energy returned to the grid. According to some aspects, primary energy consumers associated with loads directly coupled to UPSs can negotiate principal contracts with UPSs that directly provide energy meeting energy backup requirements. The energy consumers can negotiate auxiliary smart contracts with other grid-connected UPSs to implement energy arbitrage, e.g., provision of energy from energy storage associated with the other UPS s. The grid may also negotiate auxiliary contracts with UPS s connected thereto to implement peak load shaving functions.

Figure 1:
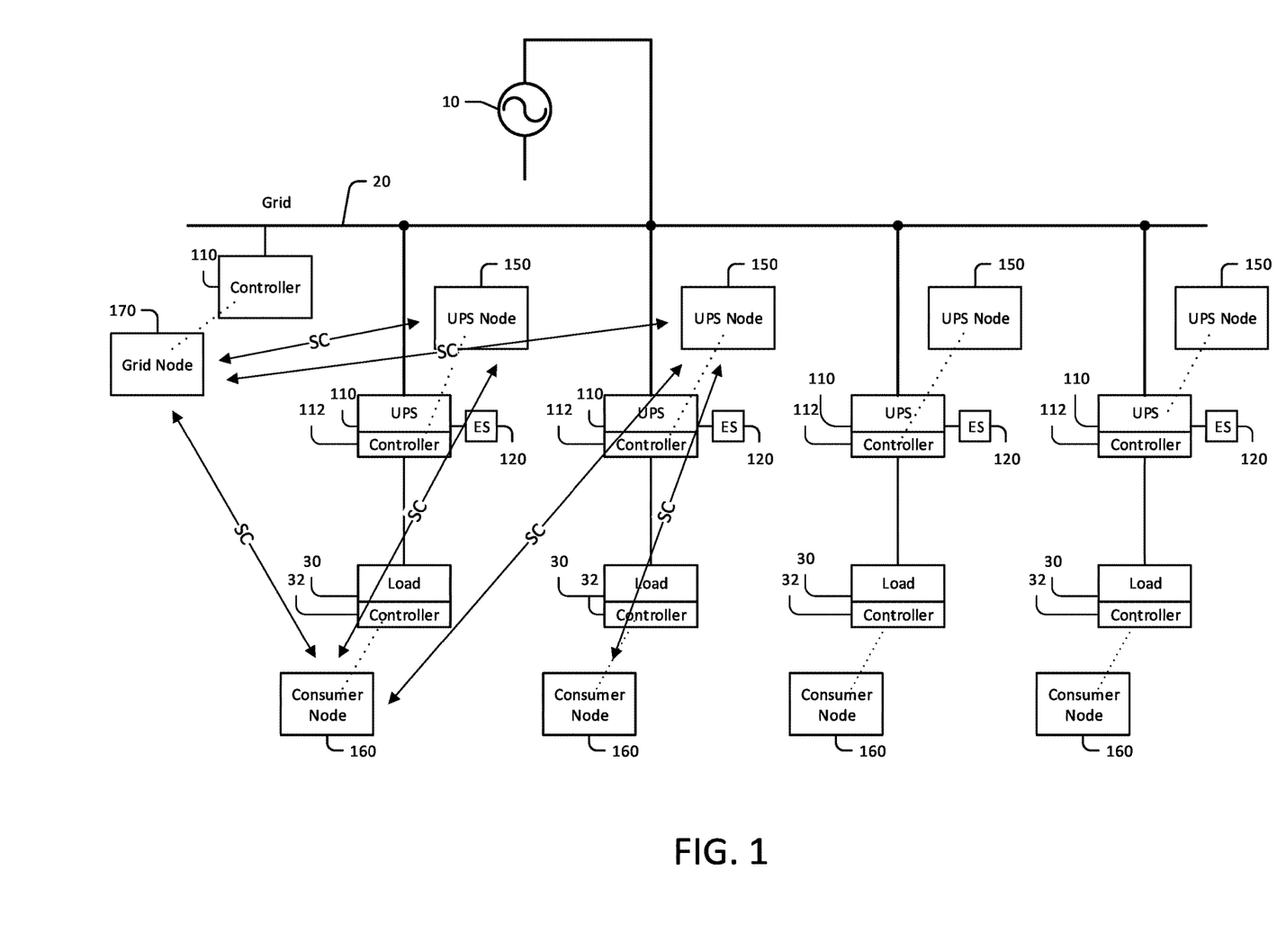
FIG. 1 illustrates a system for arbitrage of UPS-associated energy storage according to some embodiments.

FIG. 1 illustrates a system according to some embodiments of the inventive subject matter. The system includes a plurality of UPSs 110, which are coupled to a grid 20 and serve respective critical loads 30. The loads 30 may take any of a variety of different form, such as servers, computer systems, medical devices, or portions or combinations thereof. The UPSs 110 may have any of a variety of configurations, such as on-line, double-conversion, standby, line interactive and like. Each of the UPSs 110 has energy storage (ES) 120, and are configured to selectively provide power to the loads 30 from the energy storage 120 and the grid 20 based on, among other things, a state of the grid 20, such as whether not a source 10 that feeds the grid 20 is operational. The energy storage 120 may comprise any of a number of different energy storage devices, such as lead-acid batteries, lithium-ion batteries, flywheel storage systems and the like. The loads 30 may include a variety of different types of equipment, such as servers, network equipment, medical equipment, industrial equipment and the like.

As further illustrated, each of the UPSs 110 has a controller 112 integrated with, connected to or otherwise associated therewith. For example, the controllers 112 may be control circuitry of the UPSs 110 that also performs other functions, such as control of power conversion circuitry (e.g., rectifier and inverter circuits). Such control circuitry may also perform measurement functions, such as measurement of current, voltage, power and other parameters. Another controller 110 is integrated with, coupled to or otherwise associated with the grid 20. The loads 30 may have controllers 32 integrated with, connected to or otherwise associated therewith.

The UPS-associated controllers 112, the load-associated controllers 32, and the grid-associated controller 110 are configured to implement respective UPS nodes 150, consumer nodes 160 and a grid node 170, respectively, of a peer-to-peer network that implements smart contracts (SC), e.g., computer programs that implemented a blockchain-based distributed ledger that uses tokens or other digital media of exchange to arbitrage energy distribution in the system illustrated. These UPS nodes 150 may be implemented, for example, in control circuitry of the UPSs 110 or in computing devices communicatively coupled to the UPSs 110 to allow for control of energy routing circuitry of the UPSs 110 based on smart contracts established and executed by the UPS nodes 150. The consumer nodes 160 may be implemented in control circuitry of the loads 30 (e.g., in servers) as shown, or may be implemented in devices otherwise associated with the loads 30, such as in computing devices (e.g., servers, desktop computers, laptops, etc.) operated by consumers who own, lease, or otherwise manage the loads 30. Similarly, the grid node 170 may be implemented in control circuitry for the grid 20 or in devices otherwise associated with the grid 20, such as in a device (e.g., servers, desktop computers, laptops, etc.) operated by a grid operator who manages the grid 20.

Figure 2:
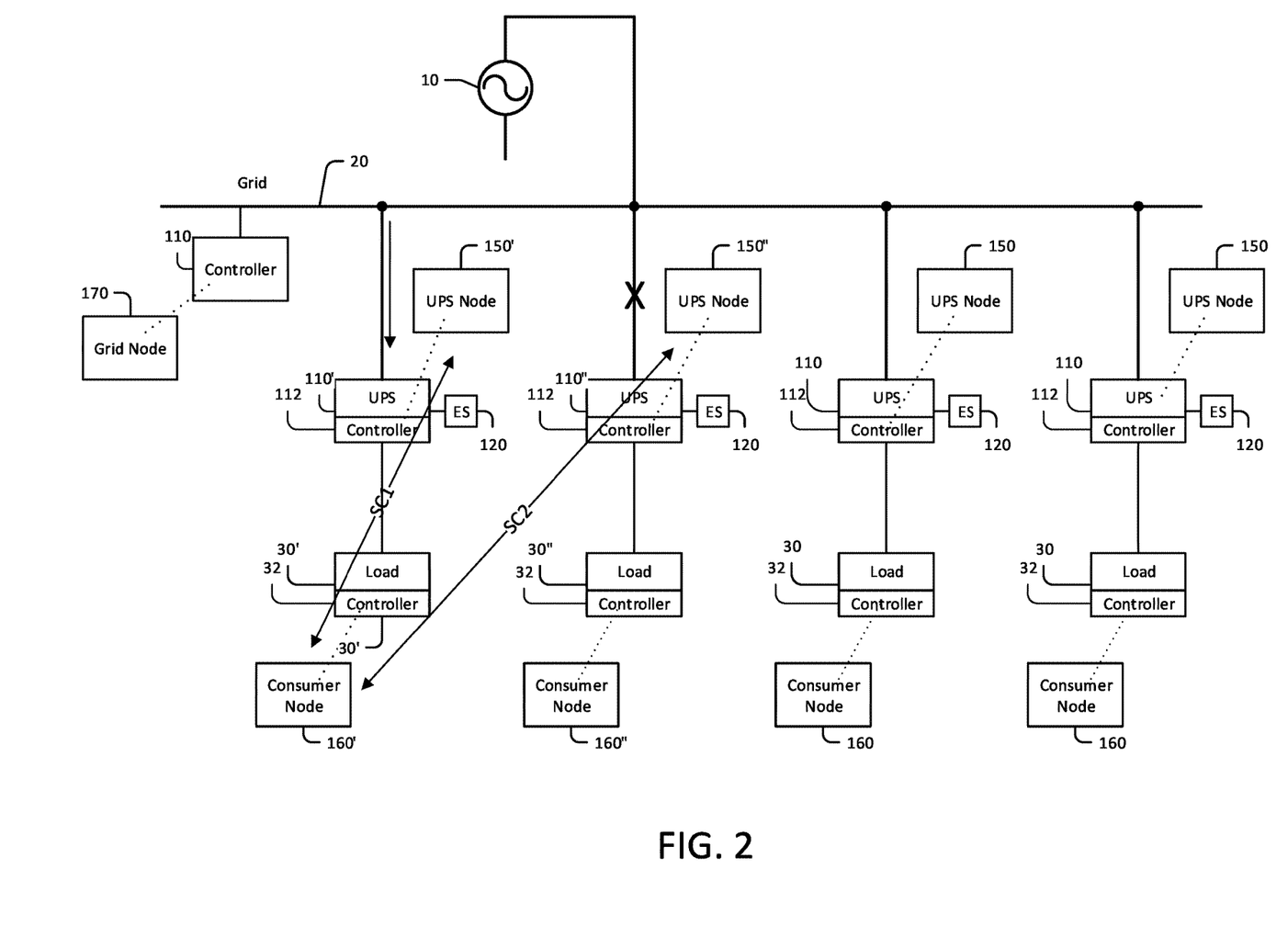
FIGS. 2 and 3 illustrate smart contract arrangements and operations for offline energy arbitrage according to some embodiments.
Figure 3:
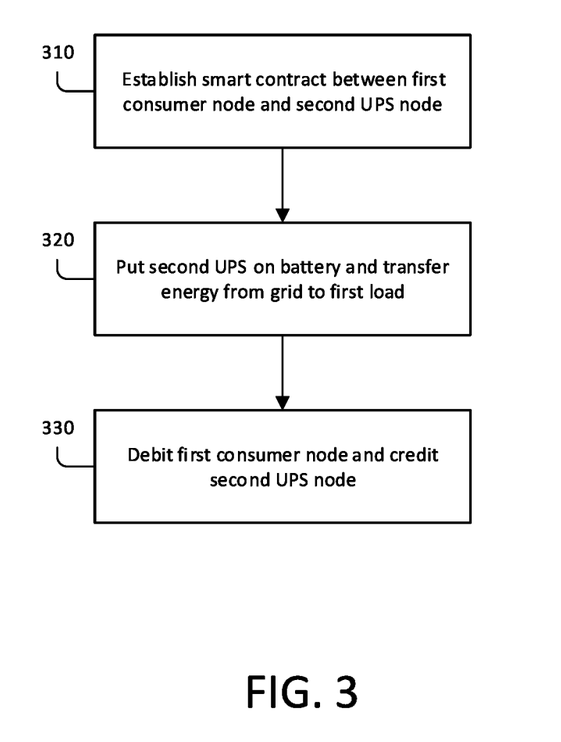

Various examples of arbitrage that may be implemented using the arrangement illustrated in FIG. 1 will now be described with reference to FIGS. 2-10. Referring to FIGS. 2 and 3, offline arbitrage may be implemented by a first consumer node 160' that establishes a first smart contract SC1 energy exchange with a first UPS node 150' associated with a first UPS 110' that serves (e.g., provides critical power backup for) a first load 30'. Referring to FIG. 3, a second smart contract SC2 is established for energy exchange between the first UPS node 150' and a second consumer node 160" associated with a second load 30" having an associated second consumer node 160" and served by a second UPS 110" (block 310). The second UPS 110" is put on battery so that it uses its associated energy storage 120 in lieu of energy drawn from the grid 20, thus resulting in a net reduction of load on the grid 20, allowing this amount of energy to be transferred to the first load 30' instead (block 320). The first consumer node 160' is debited and the second UPS node 150" is credited for the amount of energy delivered to the first load 30' under the second smart contract SC2 (block 330).

Figure 4:
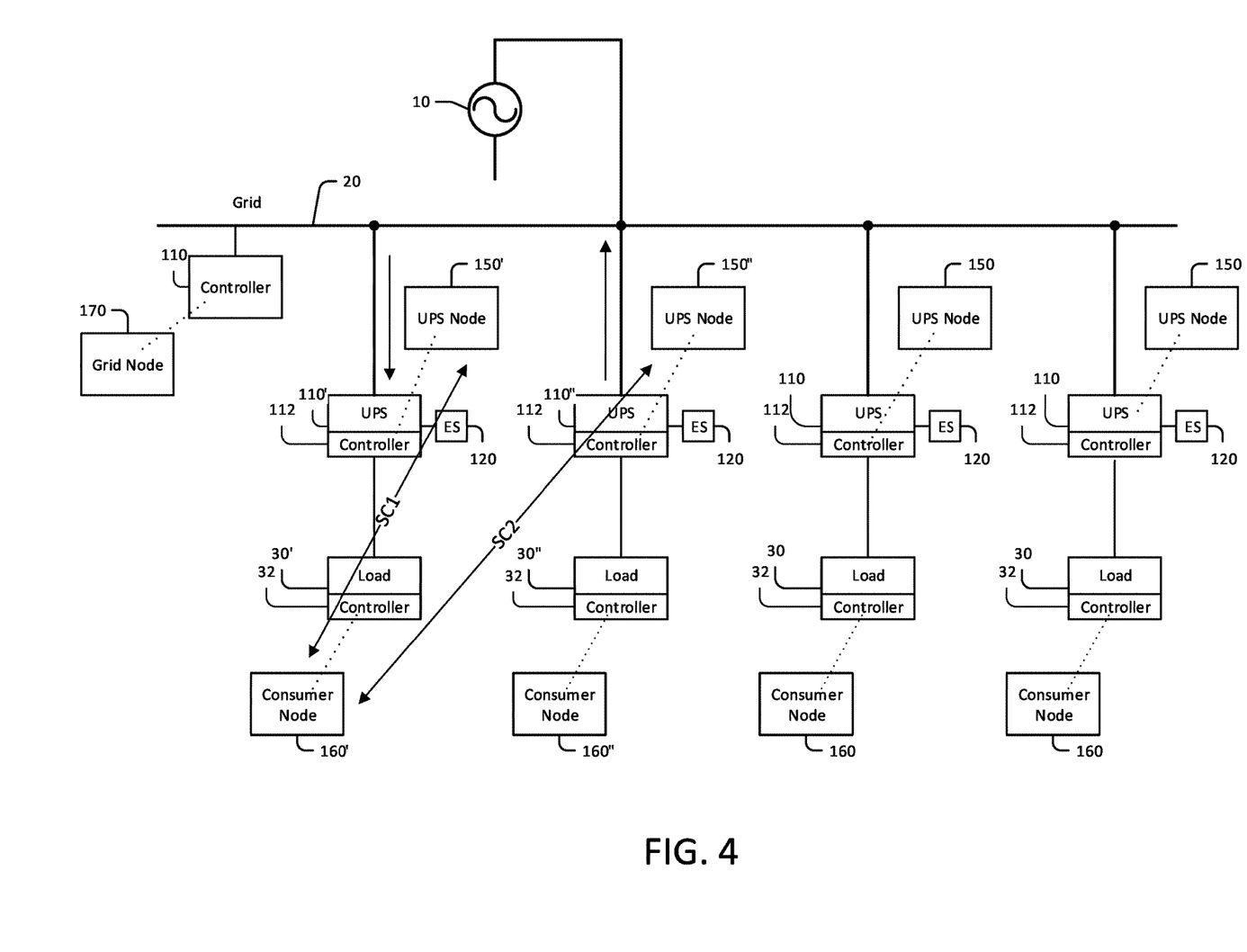
FIGS. 4 and 5 illustrate smart contract arrangements and operations for online energy arbitrage according to some embodiments.
Figure 5:
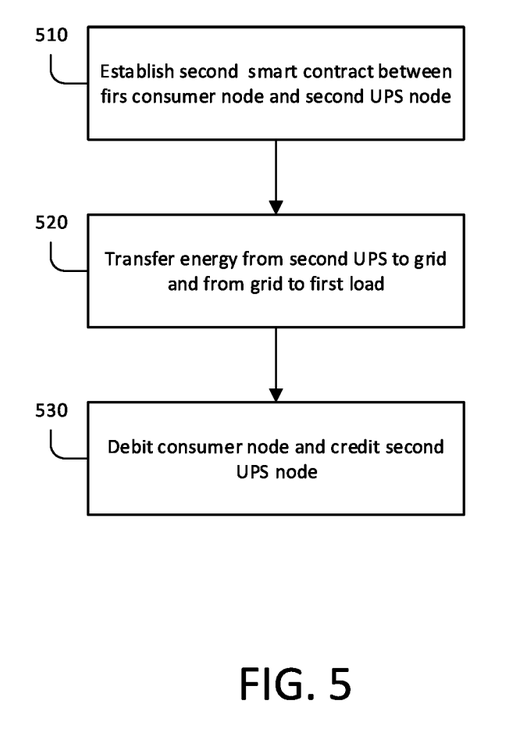

A similar online arbitrage is illustrated in FIGS. 4 and 5. A first consumer node 160' establishes a first smart contract SC1 with a first UPS node 150' for energy delivery by a first UPS 110' to a first load 30'. Referring to FIG. 5, a second smart contract SC2 is established between the first consumer node 160' and a second UPS node 150" associated with a second UPS 110" that provides energy to a second load 30" that has an associated second consumer node 160" (block 510). Under the second smart contract SC2, the second UPS 110" transfers an amount of energy specified by the second smart contract SC2 to the grid 20, with a concomitant amount of energy being transferred from the grid 20 to the first consumer load 30' (block 520). The first consumer node 160' is debited and the second UPS node 150" is credited for the amount of energy delivered to the first consumer load 30' (block 530).

Figure 6:
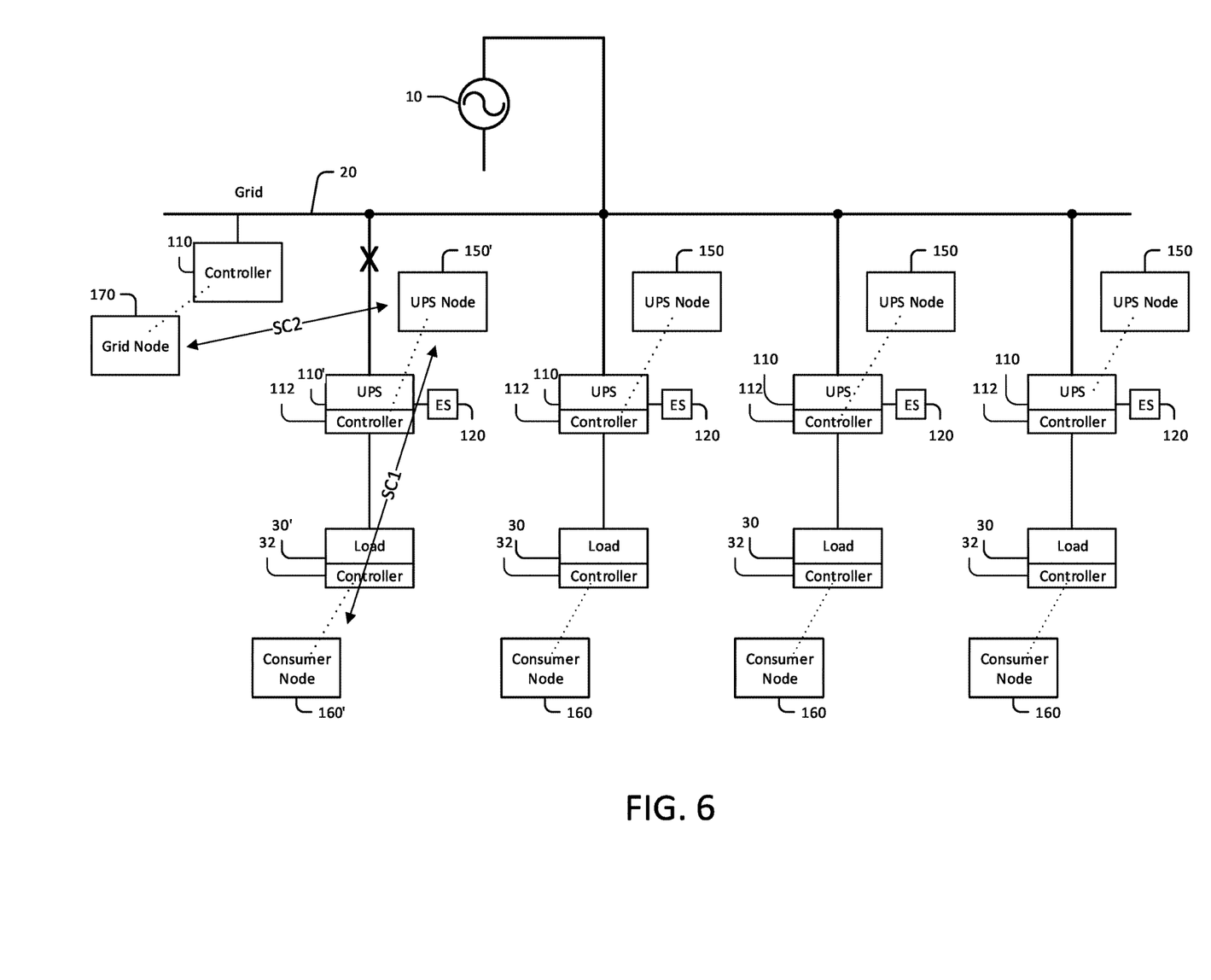
FIGS. 6 and 7 illustrate smart contract arrangements and operations for offline peak shaving according to some embodiments.
Figure 7:
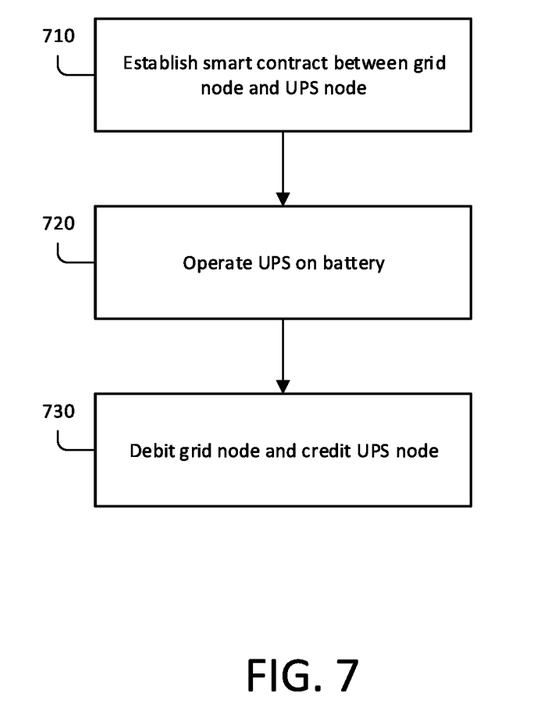

FIGS. 6 and 7 illustrate operations for offline peak shaving support for the grid 20 according to further embodiments. A first consumer node 160' has a first smart contract SC1 with a first UPS node 150' governing energy deliver from a first UPS 110' to a first load 30'. Referring to FIG. 7, a second smart contract SC2 is established between the first UPS node 150' and the grid node 170' (block 710). Under the second smart contract SC2, the first UPS 110' uses its associated energy storage 120 in lieu of energy drawn from the grid 20 by an amount specified by the second smart contract SC2, resulting in a reduction of load on the grid 20 (block 720). The transfer is debited to the grid node 170 and is credited to the first UPS node 150' (block 730).

Figure 8:
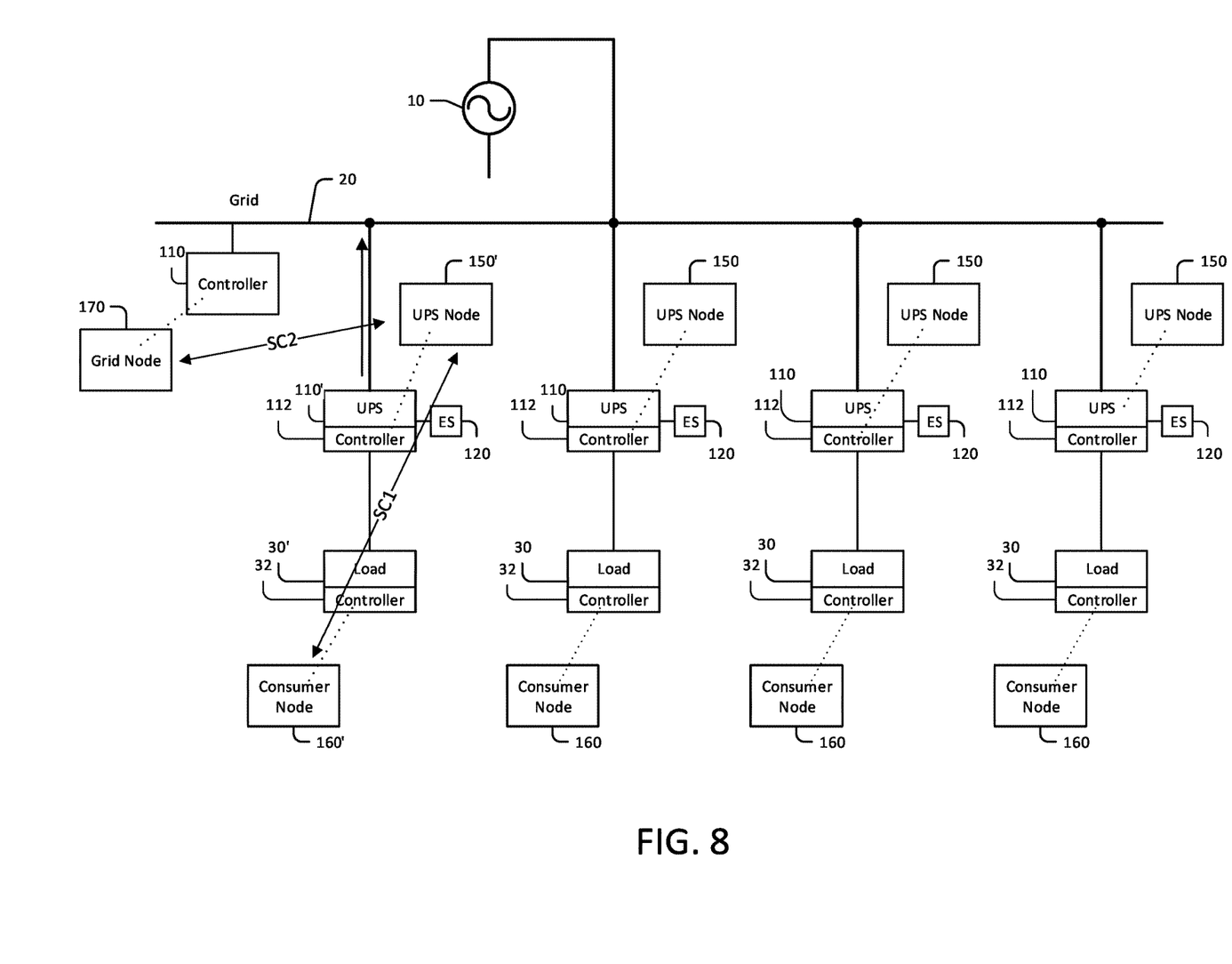
FIGS. 8 and 9 illustrate smart contract arrangements and operations for online peak shaving according to some embodiments.
Figure 9:
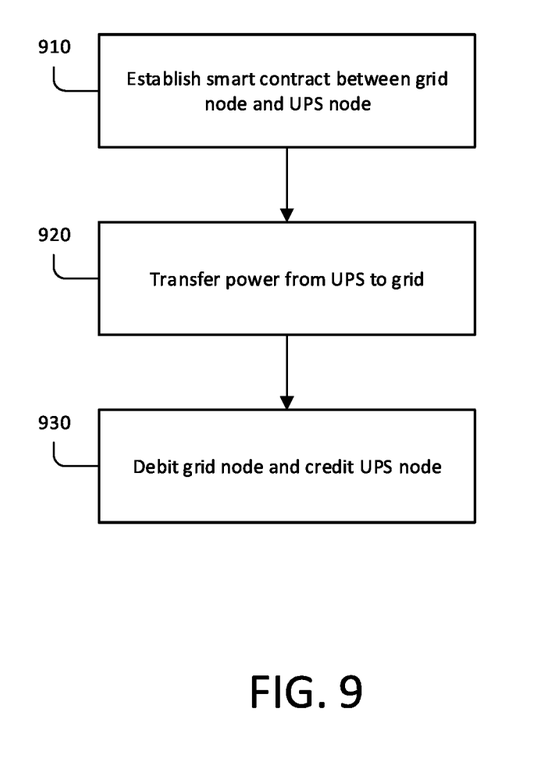

FIGS. 8 and 9 illustrate operations for online peak shaving support for the grid 20 according to further embodiments. A first consumer node 160' has a first smart contract SC1 with a first UPS node 150' governing energy deliver from a first UPS 110' to a first load 30'. Referring to FIG. 7, a second smart contract SC2 is established between the first UPS node 150' and the grid node 170' (block 910). Under the second smart contract SC2, the first UPS 110' transfers power to the grid 20 from its associated energy storage 120 using, for example, bi-directional power conversion circuitry (block 920). The transfer is debited to the grid node 170 and is credited to the first UPS node 150' (block 930).

Figure 10:
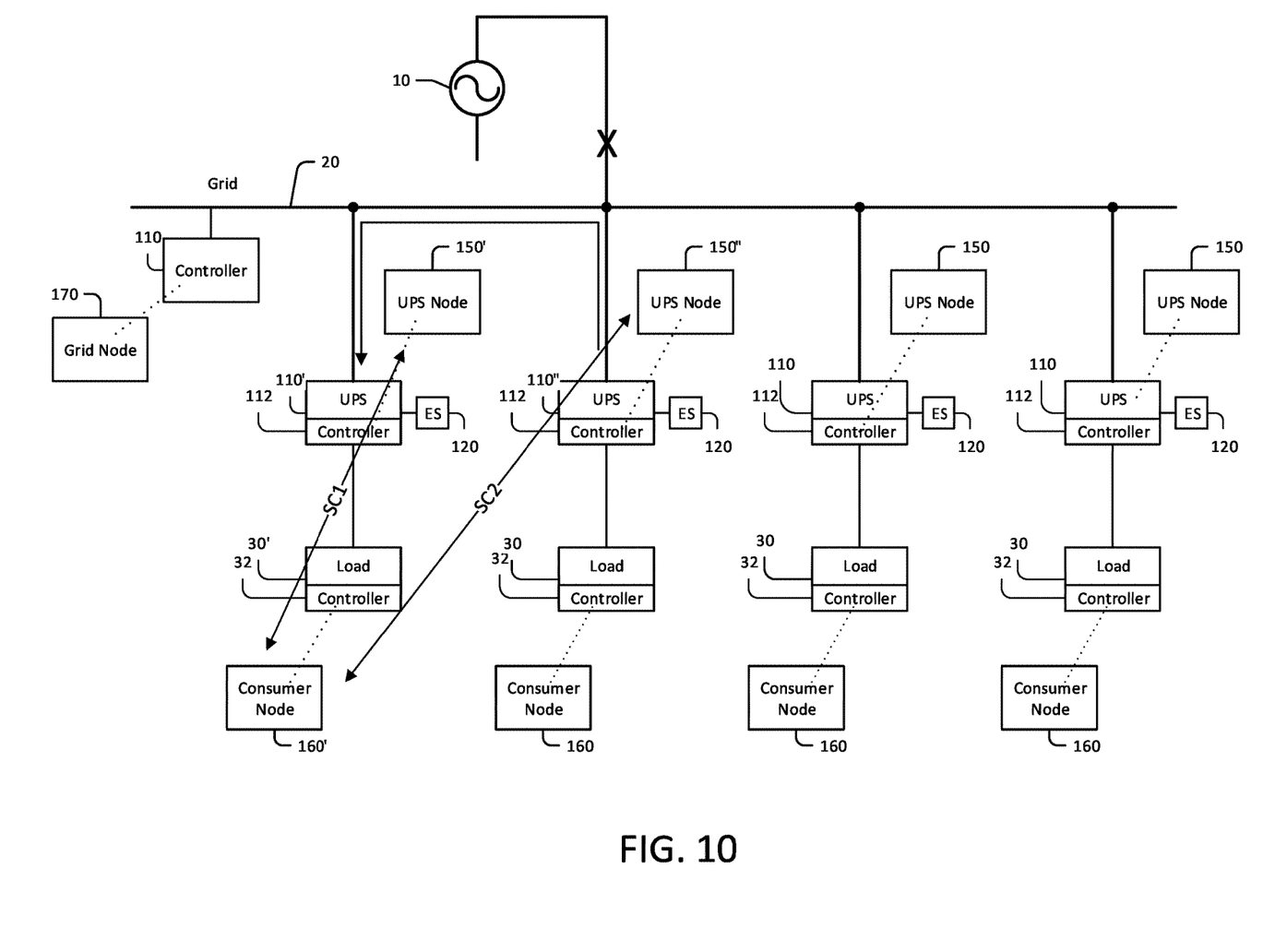
FIGS. 10 and 11 illustrate contract arrangements and operations for online decentralized backup according to some embodiments.
Figure 11:
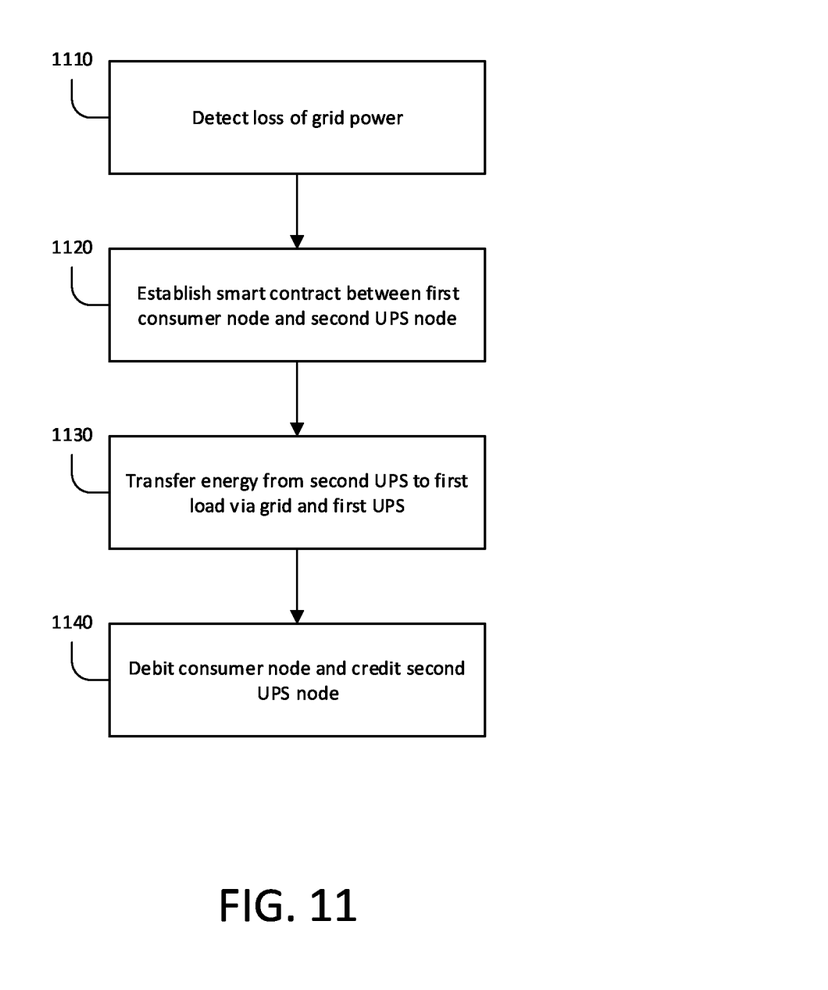

FIGS. 10 and 11 illustrate operations for online decentralized backup according to further embodiments. A first consumer node 160' has a first smart contract SC1 with a first UPS node 150' governing energy delivery from a first UPS 110' to a first load 30'. Referring to FIG. 11, responsive to detecting a loss of grid power (block 1110), a second smart contract SC2 is established between the first consumer node 160' and a second UPS node 150" for a second UPS 110" that serves a second load 30" (block 1120). Under the second smart contract SC2, the second UPS 110" transfers power to the grid 20 from its associated energy storage 120 using, for example, bi-directional power conversion circuitry, and a concomitant amount of energy is transferred from the grid 20 to the first UPS 110' and on to the first load 30' (block 1130). The transfer is debited to the first consumer node 160' and is credited to the second UPS node 150" (block 1140). It will be appreciated that in such a mode of operation, i.e., wherein the grid 20 operates essentially as a microgrid with distributed energy resources, backfeed to the main grid source 10 may be required, i.e., the portion of the grid 20 coupled to the UPSs 110 may be isolated from the main grid source 10 (e.g., other portions of a larger grid).

Figure 12:
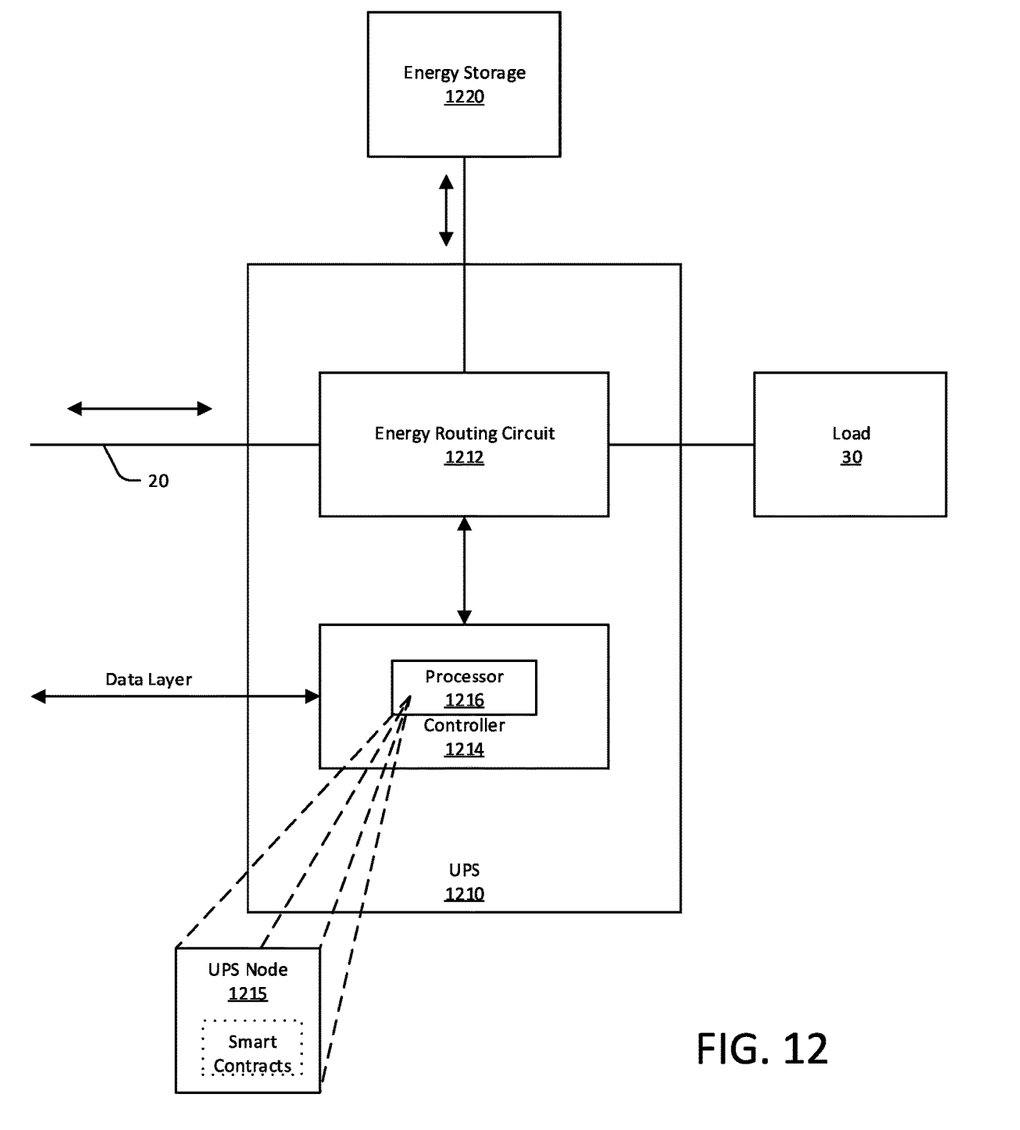
FIG. 12 is a block diagram illustrating a UPS with a smart contract capability according to some embodiments.

FIG. 12 illustrates a UPS 1210 that supports smart contract arrangements and operations along the lines described above. The UPS 1210 includes an energy routing circuit 1212, which is configured to selectively couple a critical load 30 to a grid 20 and energy storage 1220. A controller 1214 is configured to control the energy routing circuit 1212 such that the energy routing circuit 1212 can support selective energy transfers from the grid 20 and the energy storage 1220 to the load 30, from the grid 20 to the energy storage 1220, and from the energy storage 1220 to the grid 20. The controller 1214 may include, for example, a processor 1216

(e.g., a microcontroller and associated memory and peripheral circuitry) that is configured to execute control programs for control of the energy routing circuit 1212, and further configured to implement a UPS node 1215 that establishes and executes smart contracts (e.g., using data layer communications with other similar controllers) for energy arbitrage along the lines described above with reference to FIGS. 2-11. As explained above, these smart contracts can, among other things, control routing of energy from the energy storage 1220 to the load and from the energy storage 1220 to the grid 20.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A first uninterruptible power supply (UPS) comprising:
   a first energy routing circuit housed in a first enclosure and coupled to a grid and an energy storage device and configured to selectively provide energy to a first load from the grid and from the energy storage device responsive to a failure of the grid; and
   a first controller housed in the first enclosure and configured to control the first energy routing circuit, configured to communicate with a second controller individually associated with the grid, and to communicate with a third controller individually associated with a second load coupled to the grid via a second UPS having a second energy routing circuit housed in a second enclosure, the first controller configured to implement a first UPS node configured to establish and execute an energy exchange first smart contract with a first consumer node associated with the first load and at least one energy exchange second smart contract with at least one of a grid node maintained by the second controller and a second consumer node maintained by the third controller, wherein the first UPS node, the first consumer node, second consumer node and the grid node are blockchain nodes.

2. The first UPS of claim 1, wherein the at least one second smart contract comprises a smart contract with the second consumer node that causes the energy routing circuit to provide energy from the energy storage device to the first load in lieu of drawing an amount of energy from the grid and credits the first UPS node and debits the second consumer node for the amount of energy.

3. The first UPS of claim 1, wherein the at least one second smart contract comprises a smart contract with the second consumer node that causes the energy routing circuit to transfer an amount of energy from the energy storage device to the grid and credits the first UPS node and debits the second consumer node for the amount of energy.

4. The first UPS of claim 1, wherein the at least one second smart contract comprises a smart contract with the grid node that causes the energy routing circuit to provide energy from the energy storage device to the first load in lieu of drawing an amount of energy from the grid and credits the first UPS node and debits the grid node for the amount of energy.

5. The first UPS of claim 1, wherein the at least one second smart contract comprises a smart contract with the grid that causes the energy routing circuit to transfer an amount of energy from the energy storage device to the grid and credits the first UPS node and debits the grid node for the amount of energy.

6. The first UPS of claim 1, wherein the at least one second smart contract comprises a smart contract with the second consumer node that causes the energy routing circuit to transfer an amount of energy from the energy storage device to the second UPS via the grid and credits the first UPS node and debits the second consumer node for the amount of energy.

7. The first UPS of claim 6, wherein the smart contract with the second consumer node is executed responsive to a grid outage.

8. The first UPS of claim 1, wherein the at least one second smart contract limits extraction of energy from the energy storage device to maintain an amount of reserve capacity necessary to maintain the load in the event of an outage of the grid.

9. The first UPS of claim 1, wherein the first controller of the first UPS is configured to automatically execute the first smart contract and the at least one second smart contract to perform energy crediting and debiting in a distributed ledger responsive to peer-to-peer communications between the first controller of the first UPS and at least one of the second controller of the grid, a fourth controller of the second UPS and the third controller of the second load.

10. A system comprising:
    a grid;
    a first UPS coupled to the grid and comprising a first energy routing circuit housed in a first enclosure and configured to selectively provide energy to a first load from the grid and from a first energy storage device responsive to a failure of the grid and a first controller housed in the first enclosure and configured to control the first energy routing circuit;
    a second UPS coupled to the grid and comprising a second energy routing circuit housed in a second enclosure and configured to selectively provide energy to a second load from the grid and from a second energy storage device responsive to a failure of the grid and a second controller housed in the second enclosure and configured to control the second energy routing circuit; and
    third, fourth and fifth controllers individually associated with, the first load, the second load and the grid, respectively, wherein the first, second third, fourth and fifth controllers are configured to implement a a first UPS node, a second UPS node, a first consumer node, a second consumer node, and a grid node, respectively, that establish and execute smart contracts for exchanges of energy among the first UPS, the second UPS, the first load, the second load, and the grid, wherein the grid node, the first UPS node, the second UPS node, the first consumer node, and the second consumer node are blockchain nodes.

11. The system of claim 10, wherein the smart contracts comprise a smart contract between the first UPS node and the second consumer node that causes the first energy routing circuit to provide energy from the first energy storage device to the first load in lieu of drawing an amount of energy from the grid and credits the first UPS node and debits the second consumer node for the amount of energy.

12. The system of claim 10, wherein smart contracts comprises a smart contract between the first UPS node and the second consumer node that causes the first energy routing circuit to transfer an amount of energy from the first energy storage device to the grid and credits the first UPS node and debits the second consumer node for the amount of energy.

13. The system of claim 10, wherein the smart contracts comprise a smart contract between the first UPS node and the grid node that causes the first energy routing circuit to provide energy from the first energy storage device to the first load in lieu of drawing an amount of energy from the grid and credits the first UPS node and debits the grid node for the amount of energy.

14. The system of claim 10, wherein the smart contracts comprise a smart contract between the first UPS node and the grid node that causes the first energy routing circuit to transfer an amount of energy from the first energy storage device to the grid and credits the first UPS node and debits the grid node for the amount of energy.

15. The system of claim 10, wherein the smart contracts comprise a smart contract between the first UPS node and the second consumer node that causes the first energy routing circuit to transfer an amount of energy from the energy storage device to the second load via the second UPS and the grid and credits the first UPS node and debits the second consumer node for the amount of energy.

16. The system of claim 15, wherein the smart contract between the first UPS node and the second consumer node is executed responsive to a grid outage while the first and second UPSs are isolated from at least a portion of the grid.

17. A method of operating a system comprising a grid, a first UPS coupled to the grid and comprising a first energy routing circuit housed in the first enclosure and configured to selectively provide energy to a first load from the grid and from a first energy storage device responsive to a failure of the grid and a first controller housed in the first enclosure and configured to control the first energy routing circuit, and a second UPS coupled to the grid and comprising a second energy routing circuit housed in a second enclosure and configured to selectively provide energy to a second load from the grid and a second energy storage device and a second controller housed in the second enclosure and configured to control the second energy routing circuit, the method comprising:

operating the first and second controllers and third, fourth and fifth controllers individually associated with the first load, the second load, and the grid, respectively, and configured to implement a first UPS node, a second UPS node, a first consumer node, a second consumer node, and a grid node, respectively, that establish and execute smart contracts for exchanges of energy among the first UPS, the second UPS, the first load, the second load, and the grid, wherein the grid node, the first UPS node, the second UPS node, the first consumer node, and the second consumer node are blockchain nodes.

18. The method of claim 17, wherein the smart contracts comprise a smart contract between the first UPS node and the second consumer node that causes the first energy routing circuit to provide energy from the first energy storage device to the first load in lieu of drawing an amount of energy from the grid or that causes the first energy routing circuit to transfer the amount of energy from the first energy storage device to the grid and wherein the smart contract between the first UPS node and the second consumer node credits the first UPS node and debits the second consumer node for the amount of energy.

19. The method of claim 17, wherein the smart contracts comprise a smart contract between the first UPS node and the grid node that causes the first energy routing circuit to provide energy from the first energy storage device to the first load in lieu of drawing an amount of energy from the grid or that causes the first energy routing circuit to transfer the amount of energy from the first energy storage device to the grid and wherein the smart contract between the first UPS node and grid node credits the first UPS node and debits the grid node for the amount of energy.

20. The method of claim 17, wherein the smart contracts comprise a smart contract between the first UPS node and the second consumer node that causes the first energy routing circuit to transfer an amount of energy from the energy storage device to the second load via the second UPS and the grid and wherein the smart contract between the first UPS node and the second consumer node credits the first UPS node and debits the second consumer node for the amount of energy.

* * * * *

UNITED STATES PATENT AND TRADEMARK OFFICE
CERTIFICATE OF CORRECTION

PATENT NO. : 12,074,471 B2
APPLICATION NO. : 17/126861
DATED : August 27, 2024
INVENTOR(S) : Martin et al.

Page 1 of 1

It is certified that error appears in the above-identified patent and that said Letters Patent is hereby corrected as shown below:

In the Claims

Column 10, Claim 10, Line 42:
Please correct "implement a a first" to read – implement a first –

Signed and Sealed this
First Day of October, 2024

Katherine Kelly Vidal
Director of the United States Patent and Trademark Office